(No Model.)

S. BAKER.
WHIP HOLDER.

No. 284,995. Patented Sept. 18, 1883.

Witnesses:
Villie O. Stark
A. Stark

Inventor:
Samuel Baker,
by Michael J. Stark
Attorney.

UNITED STATES PATENT OFFICE.

SAMUEL BAKER, OF BUFFALO, NEW YORK.

WHIP-HOLDER.

SPECIFICATION forming part of Letters Patent No. 284,995, dated September 18, 1883.

Application filed April 9, 1883. (No model.)

*To all whom it may concern:*

Be it known that I, SAMUEL BAKER, of Buffalo, in the county of Erie and State of New York, have invented certain new and useful Improvements on a Whip-Holder; and I do hereby declare that the following description of my said invention, taken in connection with the accompanying sheet of drawings, forms a full, clear, and exact specification, which will enable others skilled in the art to which it appertains to make and use the same.

My present invention has general reference to whip-holders; and it consists, essentially, in the novel and peculiar combination of parts and details of construction, as hereinafter first fully set forth and described, and then pointed out in the claim.

Figure 1:
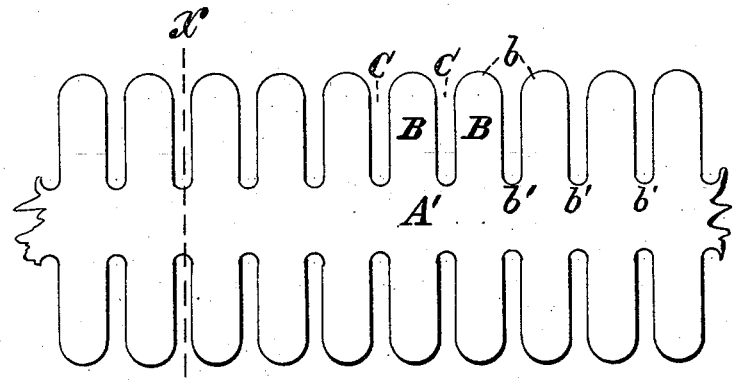
Figure 4:
Figure 2:
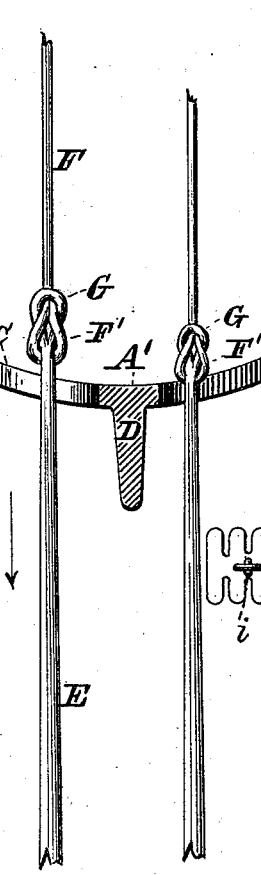
Figure 3:
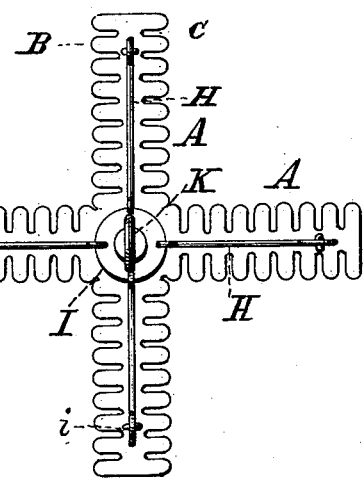

In the drawings heretofore referred to, which serve to illustrate my said invention more fully, Figure 1 is a plan of a fragment of my improved whip-holder. Fig. 2 is a transverse sectional elevation in line $x$ $x$ of Fig. 1. Fig. 3 is a plan view of the complete holder. Fig. 4 is a plan of the whip-receiving notches of the usual whip-holder.

Similar letters of reference indicate corresponding parts in all the figures.

The object of my present invention is the construction of a simple and efficient whip holder and exhibitor of that class for which Letters Patent of the United States were granted to me on the 24th day of October, 1882.

A in the drawings represents a serrated frame or cross having along its edges a series of leaves, B, formed by notches C, as clearly shown in Fig. 1. In the Letters Patent heretofore cited, as well as in whip-holders of anterior construction, these notches were either tapering (having converging sides) or V-shaped, as illustrated in Fig. 4. This construction of the notches C is faulty and objectionable, in view of the fact that when a whip is placed into the same it will tightly wedge itself into the said notch, and that when an attempt is made to remove the whip from said notch the result will generally be that the loop and snapper are being injured and frequently cut off altogether. To overcome this as well as various other obvious objections to the construction referred to, I construct the notches C of my present whip-holder of a U shape—that is to say, having parallel or nearly parallel sides and a circular bottom, $b'$, as shown in Fig. 1 in nearly full size. I furthermore construct the wings A of the cross of concavo-convex shape, as shown in Fig. 2, and form a rib, D, on the same to strengthen the device. The object of thus forming the said wings is to produce on the top surface a double incline sloping toward the center line of the said wings, so that when a whip, E, Fig. 3, is placed into said notch C, and then pulled downwardly in the direction of the arrow shown, the tip of the whip will move downward until the loop G on the tip and the loop $F'$ on the snapper F will rest upon the upper concave surface of said wings, and thereby securely hold or suspend the whip, yet in no wise interfering with its ready removal by simply pushing the whip upward.

It will be readily seen that the difference in construction of the notches C (shown in Figs. 1 and 4) produces different results, and that the old method of forming these notches V-shaped is entirely faulty and wrong. To enable the whips E being readily placed into said notches, I form the front part or ends of the leaves B semicircular at $b$, whereby the said notches gradually increase in size. To suspend the cross-shaped holder I provide the same with four suspender-rods or similar mechanism, H, fixed to eyes $i$ on said wings with one end, and to a disk, I, on the other end. This disk I has centrally a swivel, K, by means of which the entire apparatus is suspended from a hook, $c$ $c$, in an obvious manner.

I am aware of the patent granted to Scott, April 25, 1882, No. 257,084, for whip-holders, showing a device having U-shaped notches for the reception of the whip. I do not therefore claim such as my invention.

Having thus fully described my invention, I desire it to be understood that I do not wish to claim a whip-holder having V-shaped notches, because such notches have now been in use for fourteen years or more; nor do I claim here a whip-holder as shown in the Letters Patent granted to me as aforesaid; but

What I do claim as new, and desire to secure to me by Letters Patent of the United States, is—

As an improved article of manufacture, a whip-holder of X shape, the branches of which have each a central part, A', having leaves B, inclined toward said central portion, the spaces between said leaves being of U shape, and the portion A', provided with ribs D, as stated, said cross being suspended by means of the swivel-ring K, disk I, and the suspender-rods H, the whole being constructed and combined substantially in the manner as and for the object stated.

In testimony that I claim the foregoing as my invention I have hereto set my hand in the presence of two subscribing witnesses.

S. BAKER.

Attest:
MICHAEL J. STARK,
WILLIE O. STARK.